Dec. 9, 1930.　　　　　S. SCHIFF　　　　1,784,113
PROCESS AND APPARATUS FOR DIVIDING PLASTICS
Original Filed March 21, 1923　　　4 Sheets-Sheet 1

Inventor
SIGMUND SCHIFF
By Walter F. Murray
Attorney

Dec. 9, 1930.  S. SCHIFF  1,784,113
PROCESS AND APPARATUS FOR DIVIDING PLASTICS
Original Filed March 21, 1923  4 Sheets-Sheet 3

Inventor
SIGMUND SCHIFF
By Walter H. Murray
Attorney

Dec. 9, 1930. S. SCHIFF 1,784,113
PROCESS AND APPARATUS FOR DIVIDING PLASTICS
Original Filed March 21, 1923  4 Sheets-Sheet 4
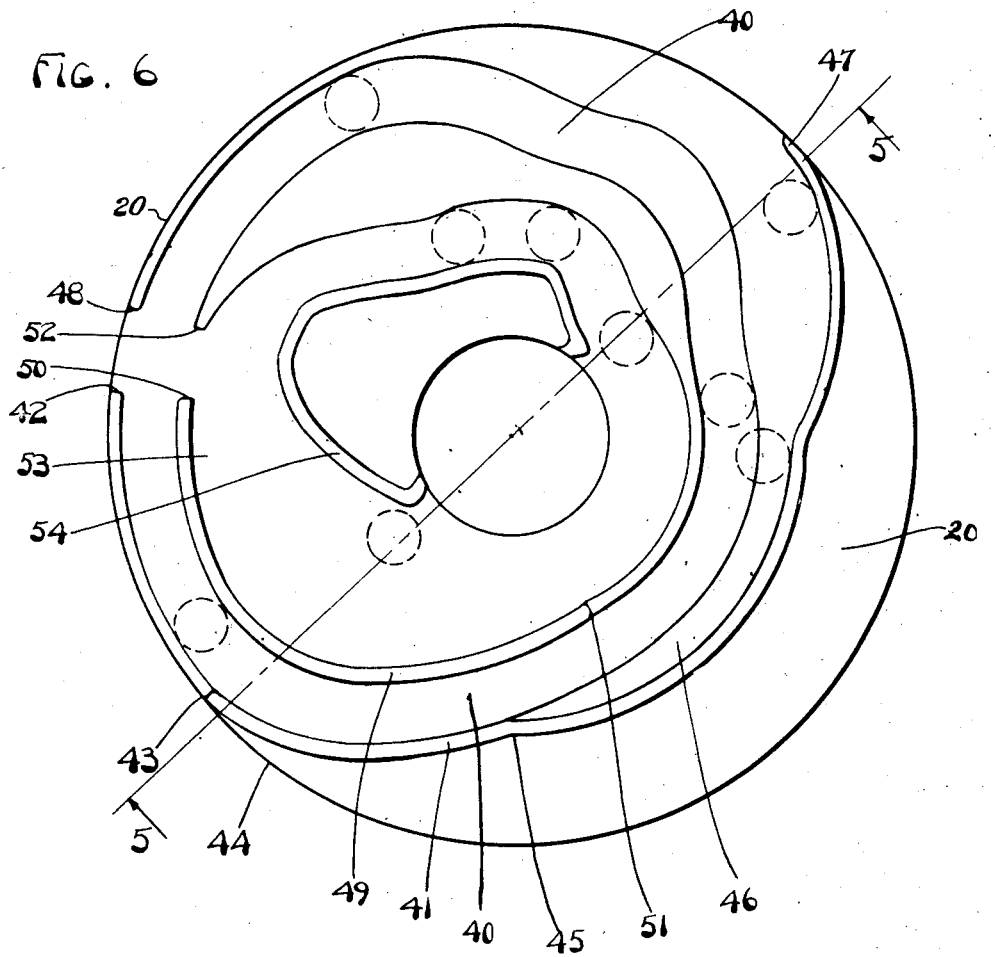
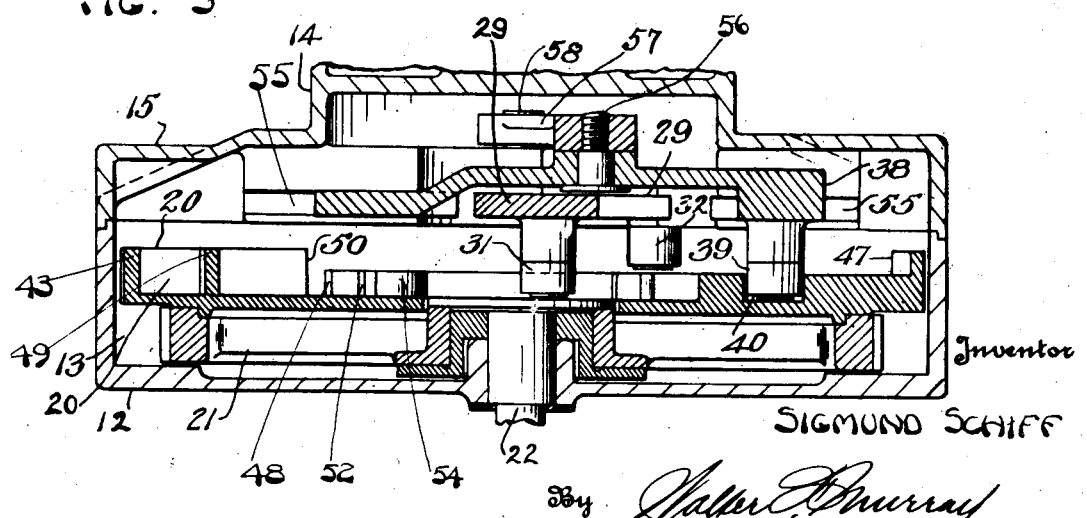
Inventor
SIGMUND SCHIFF
By Walter F. Murray
Attorney Patented Dec. 9, 1930

1,784,113

UNITED STATES PATENT OFFICE

SIGMUND SCHIFF, OF CINCINNATI, OHIO, ASSIGNOR TO THE J. H. DAY COMPANY, OF CINCINNATI, OHIO, A CORPORATION OF OHIO

PROCESS AND APPARATUS FOR DIVIDING PLASTICS

Application filed March 21, 1923, Serial No. 626,552. Renewed January 9, 1930.

My invention relates to dividers such as are used in measuring or dividing plastics such as dough and the like.

An object of my invention is to provide a device that will avoid certain objectional features of dividers heretofore made, and that will accomplish results and advantages unattained by devices produced up to this time.

Another object of my invention is to provide a simple and efficient device for the purposes stated.

Another object of my invention is to provide a divider that will accurately measure or divide the plastic so to accomplish evenness of weight of the various lumps of plastic divided from a mass upon which the device is adapted to operate.

Another object of my invention is to provide a device that will not produce deleterious effects upon plastics such as dough, and which will not in any way interfere with the expeditious, natural and normal proofing of dough.

Another object is to remove gas from the dough before measuring the dough whereby to attain equal weight of succeeding lumps of dough with a minimum of compression.

These and other objects are attained by the means and method described herein and disclosed in the accompanying drawings, in which:

Fig. 5 is a sectional view on line 5—5 of Fig. 3 and on line 5—5 of Fig. 6.

Fig. 6 is a plan view of a cam forming a detail of my invention.

Figure 1:
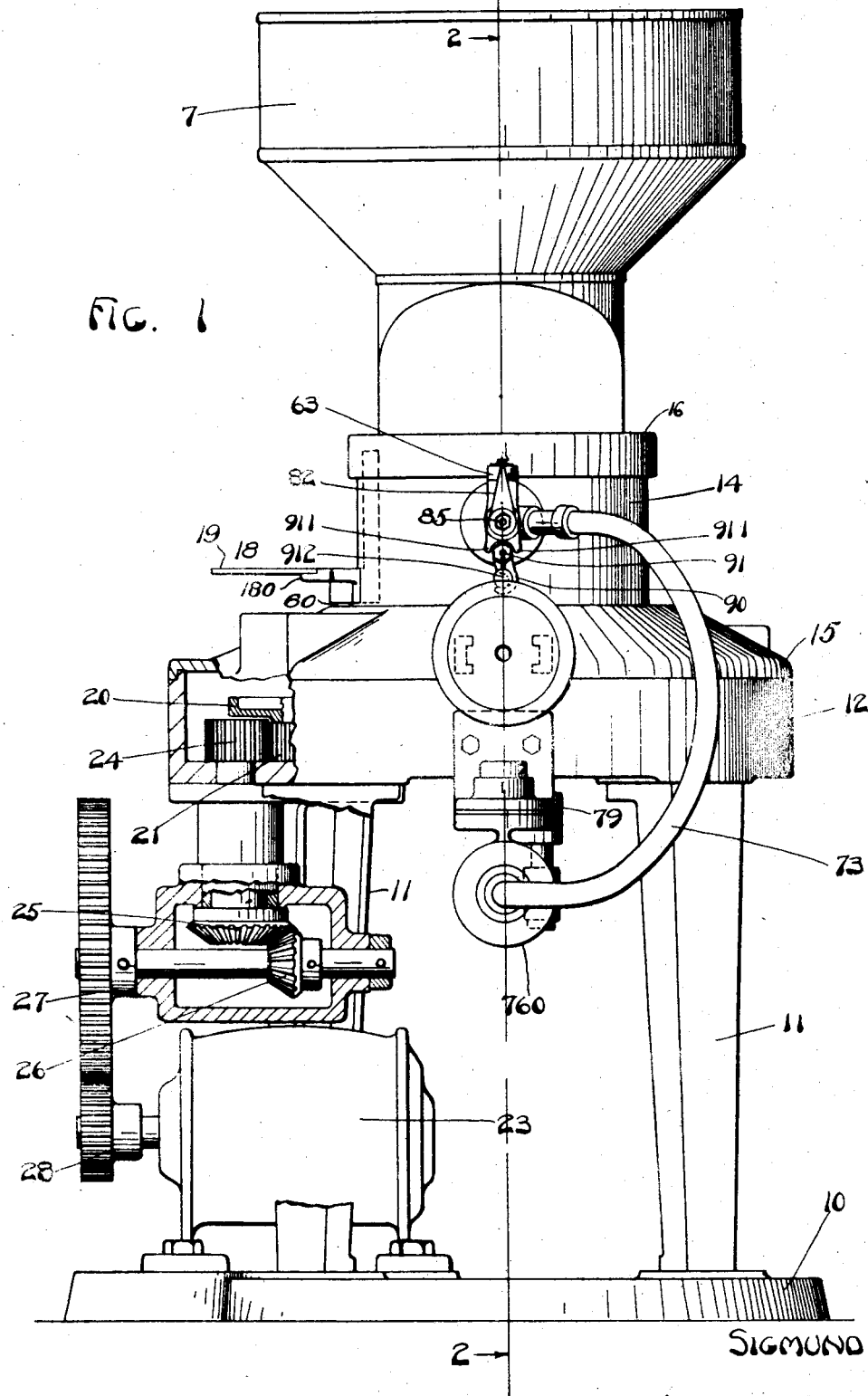
Fig. 1 is a front elevation of a device embodying my invention, parts being broken away.

My invention comprises a hopper 7 from which a plastic mass may be drawn into a cylinder or measuring receptacle 8, from which the mass is subsequently ejected. The plastic mass is induced or drawn into the cylinder 8 by the recession of a reciprocating plunger 9 whereupon a relative movement of the hopper and the cylinder is accomplished to reduce the passage of communication between the cylinder and the hopper. A vacuum is created in the cylinder at the time the plunger is actuated; a pump 760 is employed for this purpose. The cylinder has its one end so exposed to dough in the hopper that dough in the hopper engaging the exposed portion of the hopper, produces an air seal so that dough will be drawn into the cylinder. The creation of the vacuum causes the gas in the larger pockets in the dough to leave the dough. These gases are withdrawn before the compression period as herein explained. The plunger 9 is then moved toward and upon the mass contained within the cylinder 8, at which time, the gases contained within the cylinder 8 are drawn off or otherwise excluded and the plastic mass contained within the cylinder 8 is operated on to some extent so as to push some of the mass back into the hopper 7 whereby to effect a uniform consistency and mass in succeeding lumps of the plastic discharged from the cylinder 8. After the foregoing has occurred, a further relative movement of the hopper and the cylinder places the cylinder completely out of communication with the hopper and upon the further movement of the plunger, the lump of plastic contained within the cylinder 8 is discharged.

Figure 4:
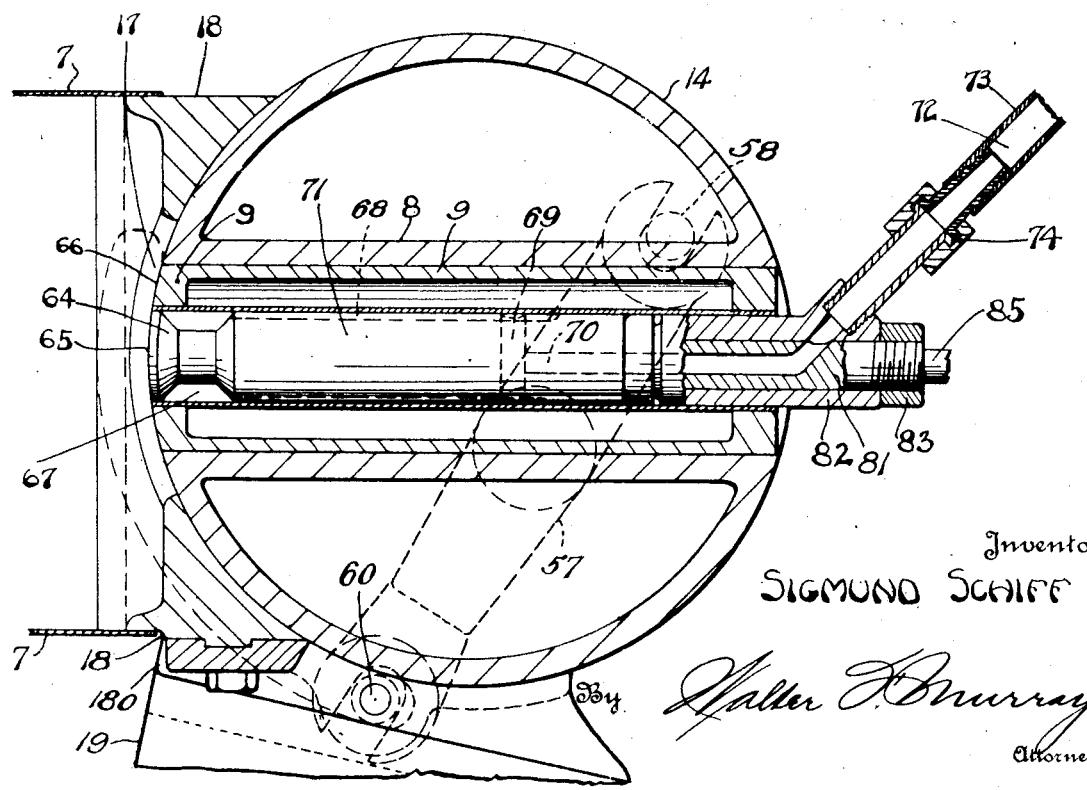
Fig. 4 is an enlarged sectional view on line 4—4 of Fig. 2.

A suitable base 10 carries legs 11 spacing the base from the fixed or normally stationary housing 12 having formed within it a chamber 13. The chamber 13 contains suitable mechanism for effecting oscillation of the hopper and for effecting reciprocation of the plunger in the cylinder. The drum like top 14 of the upper portion 15 of the housing 12 has formed in it the cylinder 8 and rotatably supports a cylindrical casing 16 carrying the hopper 7. The casing 16 carries a depending apron 18 in which is formed an aperture 17 which may be brought into registration with the cylinder 8. Communication is effected between the cylinder and the hopper 7 by way of aperture 17. The aperture 17 is made sufficiently large that the cylinder end is exposed for at least one half inch about the plunger chamber, whereby dough in the hopper may engage the cylinder and form an air seal about the end of the plunger chamber. The hopper has an opening 700 intermediate its top and bottom to permit more ready entry of dough into the cylinder. The movement or flow of the dough to the cylinder may be effected by gravity, air pressure or other suitable means. The hopper is capable of movement to such extent that the plunger 9 may discharge a mass of dough to one side of the hopper 7. By reference to Fig. 4 it is apparent that the apron 18 terminates at a short distance to one side of the port 17 and forms a closure for the cylinder while the hopper is moved from registration with the cylinder, and that when the hopper has been moved to its limit, that the dough may be discharged from the cylinder. A suitable platform 19 is provided to receive the dough discharged from the cylinder. As shown herein the platform 19 is carried by bracket 180 mounted on apron 18, at one side of the aperture 17 therein, so that when the aperture 17 is moved beyond the cylinder, the platform is aligned with the cylinder to receive the dough when discharged from the cylinder. The platform need not be movable with the hopper and apron. The chamber 13 contains a cam 20 that is employed for actuating the hopper and the plunger. Any other suitable means may be employed in lieu of the cam. As disclosed herein the cam carries upon its lower face a gear 21, the gear being mounted upon a shaft 22 revolubly supported by the housing 12, and which gear is driven from a suitable motor 23 by way of suitable gearing mechanism comprising gears 24, 25, 26, 27 and 28, and suitable shafts for mounting said gears. There is mounted above the cam a plunger actuating slide or arm 29 on which is adjustably mounted a block 30. The arm and the block carry rollers 31 and 32 respectively. A hopper actuating slide or arm 38 carries a roller 39. The rollers extend into ways formed in the cam. By reference to Fig. 2, it is apparent that the rollers 31 and 32 are disposed at different levels. Rollers 31 and 39 are disposed in the same plane. The upper roller 32 may pass over certain low portions of the walls engaged by the lower rollers 31 and 39 and is in no wise affected by the walls that act upon the lower roller except at certain high places of such walls. The adjustment of block 30 varies the distance between rollers 31 and 32, whereby to attain various lengths of reciprocation of the plunger, thereby effecting adjustment of the lumps of plastic divided or separated from the mass in the hopper.

Referring to Fig. 6, the way 40 at all times contains the roller 39 for actuating the hopper. The outer wall 41, defining the way 40 is low from the beginning 42 of said wall to the place 43 at which place this wall extends inwardly from the outer edge 44 of the cam. The high portion of the wall 41 extending from 43 defines the way 40 to the place 45, at which place the wall bulges outwardly on a line concentric to the cam periphery, and provides a supplemental way 46 communicating at its bottom with the way 40. The wall 41 continues high until it reaches the point 47 substantially at the outer edge of the cam, from which place the wall continues low to the end 48 of such wall. The upper roller 32 is adapted to follow the inner face of the high portion of the wall 41. The wall 49 defining the inner edge of the way 40, is high at its beginning 50, the high portion thereof terminating at 51, from which point the wall continues low to its end 52. A way 53 is formed inside the wall 49, and a low wall 54 within the wall 49 modifies the low portion of the way 53. The rollers 31 and 39 follow the low walls except when the movement of the high roller so positions the low roller associated with the plunger slide, that such low roller is moved from such walls. By adjusting the rollers on the plunger slide, the weight of the lumps of dough is modified.

The hopper slide 38 is reciprocally contained in the way 55 formed in the upper portion 15 of the housing 12, and is pivotally connected by means of a suitable pin 56, to a cam lever 57. The opposite ends of the lever 57 are bifurcated, the branches of one end thereof extending about a fixed pin 58 carried by a bracket 59 on the housing 12, and the branches of the other end of said cam lever extend about a pin 60 carried by the apron 18 of the secondary casing 16 and extending downwardly into the chamber 13 through an arcuate slot or opening 61 formed in the upper portion 15 of the housing 12. From the foregoing it will be apparent that as the roller 39 is moved toward and away from the center of the cam, the cam lever 57 will be moved about the pin 58 whereby to oscillate the pin 60, thereby actuating the hopper accordingly.

Figure 2:
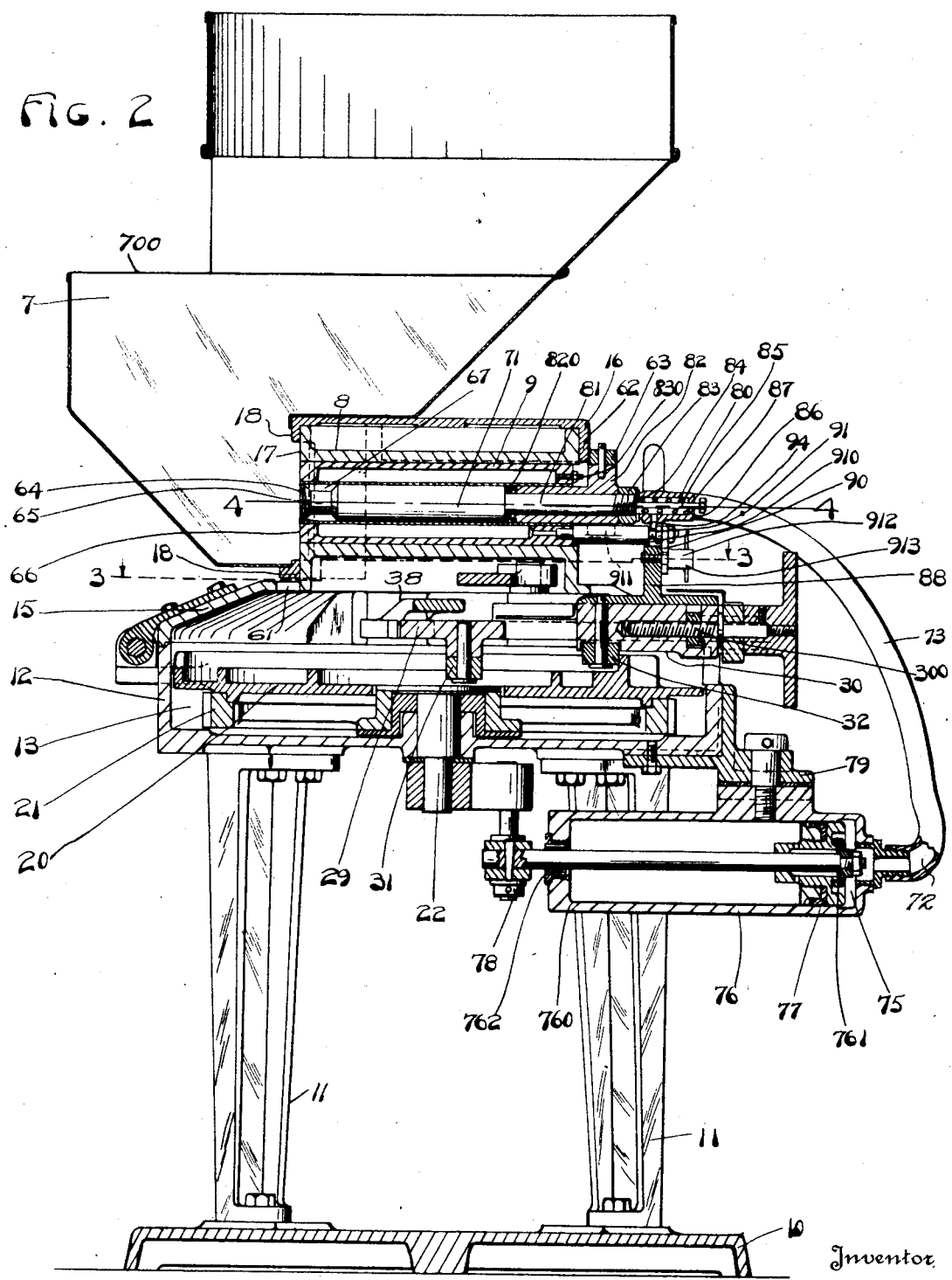
Fig. 2 is a sectional view on line 2—2 of Fig. 1.
Figure 3:
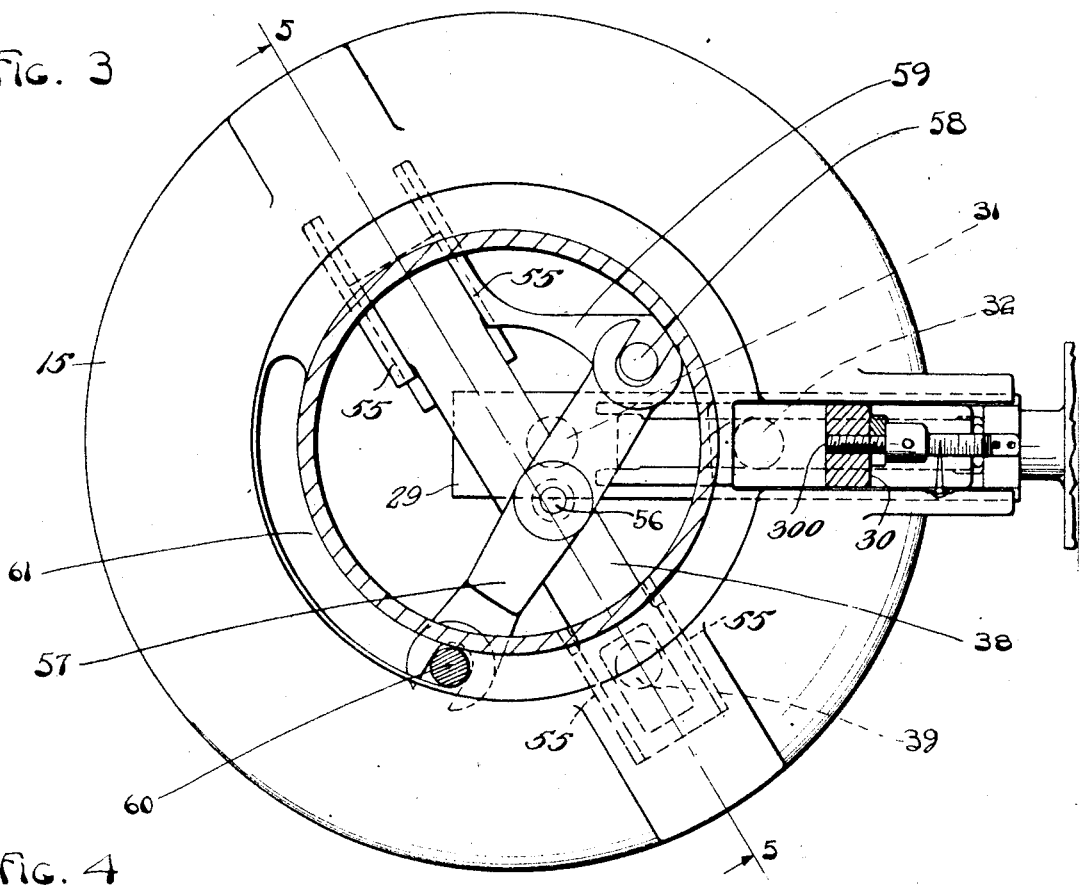
Fig. 3 is an enlarged sectional view on line 3—3 of Fig. 2.

It should be observed, see Fig. 2, that the casing 16 has a depending flange 62 that functions as a stop upon which a roller 63 associated with the valve 64 may engage. The valve 64 is contained within the plunger 9. The face 65 of the valve is adapted to lie flush with the face 66 of the plunger. The valve is capable of movement toward the hopper whereby to place the chamber 67, immediately to the rear of the valve face 65, in communication with any space extending from the face 66 of the plunger. The chamber 67 communicates by way of suitable grooves and ducts 68, 69 and 70 formed in the valve stem 71, with the bore 72 of a pipe or hose 73. Suitable coupling means as shown at 74 may be used to connect the hose 73 and the valve stem 71. The bore in the hose 73 communicates with a chamber 75 formed within a cylinder 76 carried by the housing 12, and extending below the housing. A piston 77 is reciprocally contained within the chamber 75 and is reciprocated from a crank 78 mounted upon the lower end of the shaft 22. The cylinder 76 is pivotally supported by the bracket 79 carried by the housing 12. The function of the piston 77 is to withdraw gases from the chamber 67 and the opening made in the cylinder by the movement of the plunger 9, in other words a vacuum is created in said chamber and opening, and when the plunger is then moved toward the dough contained within the cylinder 8 the mass of dough is not acted upon until the plunger comes into actual contact with the dough. Heretofore there has been no provision made for the elimination of the gases and in devices where a plunger was utilized to create an opening in a casing, into which opening a plastic was then pushed or drawn, the gases excreted by the plastic as a result of the action thereon precluded complete filling of the space provided by the movement of the plunger, as a result of which it was possible to secure uniform weight of succeeding lumps of plastic, only at high pressures detrimental to the dough.

The pump 760 is so constructed that a vacuum is held in the cylinder until the plunger has moved toward the hopper so as to eliminate the vacuum, whereupon the piston may move forwardly and air may enter the hose 73. As soon as the piston moves on its suction stroke, The valve 761 in the piston is closed. The piston chamber may communicate with the atmosphere by way of ports 762 in the cylinder 76.

The valve 64 is reciprocated by the joint action of the stop formed on the depending flange 62 of the casing 16 operative upon the roller 63, a spring 80 operative upon the valve stem 71, and the movement of the plunger. The rear end of the valve stem 71 is reduced as shown at 81, and is fixedly attached to a block 82 carrying the roller 63. The block 82 is in function, a part of the valve stem and is provided merely to seat a washer 820 for engagement on the wall confining the valve stem. The sliding block 87 is capable of a slight relative movement longitudinally of the valve stem intermediate the nut 83 carried by the threaded end 84 of the valve stem and a nut carried by a rod 85 carried by the reduced portion 81 of the valve stem. The rod 85 extends through the spring chamber 86 formed in the sliding block 87 and containing the spring 80.

The ends of the spring abut the block 87 and the valve stem and the spring yieldingly resists movement of the valve stem. A pin 94 carried by the block 87 is yieldingly retained in a depression communicating with the annular groove 910 in arm 91 carried by the plunger. The block is capable of rotatory motion upon the valve stem whereby to lodge and release the pin 94 in relation to the arm. The valve stem has depending flanges 911 that lie adjacent the arm 91 and preclude rotatory motion of the valve stem. The arm carries a pivotally mounted depending hooked link 90, the hooked lower end of which link is adapted to engage the shank of a screw 912. The head 913 of the screw is adapted to secure the link to the bracket 88 carried by the plunger slide block 30. This structure permits ready removal of the valve for cleaning thereof. From the foregoing it will be apparent that the movement of the plunger slide is transmitted through the bracket 88, the link and the arm 91 to the plunger.

The plunger carries an adjustable screw 830 for limiting the movement of the valve stem 71 and valve associated therewith, under the influence of the spring 80. By adjusting the screw 830 and locking the screw in its adjusted position the extent to which the valve 64 is opened is controlled. It should be noted that when the plunger is first moved, the valve remains stationary until the screw 830 engages the valve stem 71, whereupon the valve and valve stem move with the plunger.

Any suitable means may be provided to secure relative adjustment of the rollers 31 and 32, for example the hand wheel and screw connected therewith as shown in Fig. 2, wherein a suitable threaded bore is provided in the block 30 in which the screw 300 carried by the plunger slide 29 adjustably engages.

In the operation of my device the mass of dough or the like is placed in the hopper 7. As the cam is revolved the plunger is actuated in the cylinder 8, and is moved away from the hopper. The piston 77 is also moved through its cylinder 76 thereby creating a vacuum in the cylinder 8 into which dough from the hopper enters. The parts bear a relation such that the valve 64 is opened at the beginning of the movement of the plunger, and the gases are withdrawn to such extent that uniform weight of succeeding lumps of dough may be attained. The hopper slide then moves the hopper part way so as to reduce the communication between the port 17 and the opening in the cylinder 8. The plunger is then moved toward the hopper and as the plunger moves toward the hopper, the dough in the cylinder 8 completely fills the chamber in the cylinder. The movement of the plunger is continued a short distance further so that the plunger will push some of the dough back into the hopper through the reduced opening between the cylinder and the walls of the port 17, slightly compressing the dough and thereby assuring that succeeding lumps of dough will all be of a substantially uniform density. The hopper is then moved farther, to the limit of its arcuate movement, thereby exposing the dough contained in the cylinder 8, whereupon the plunger is actuated to bring its face flush with the face of the cylinder, discharging the dough on the table or platform 19 and closing the valve. The hopper is then moved back to its first position at which time the faces of the valve and plunger are cleaned, and the operation is repeated.

It should be noted that the action of the valve 64 is such that dough cannot clog or obstruct the valve opening, for should some dough lodge on the valve seat, the dough would be moved into the chamber 67 and when the valve is again opened, the valve seat and face contain no dough that can obstruct the entry of gases into the chamber 67. The elimination of dough from the valve face precludes a dough film obstructing the opening when the valve is opened.

The number of cylinders and plungers may be increased for increasing the capacity of the divider. The pump is used because in dividing dough, the gases break through the dough. In dividing some substances the pump may be dispensed with. The term cylinder is used to designate any suitable measuring element or dough receiving receptacle, wherefore it is to be understood that any element, regardless of its shape, for attaining the function of the measuring pocket, is comprehended within the term cylinder as used in the specification and in the claims.

What I claim is:

1. In a device of the class described the combination of a hopper, a cylinder, a plunger within the cylinder, means for effecting relative movement of the hopper and the cylinder whereby to move the plunger into and from registration with the hopper, means to actuate the plunger for creating a chamber in the cylinder for receiving a plastic from the hopper and for moving the plunger toward the hopper while the chamber is in communication with the hopper whereby to move a portion only of the plastic from the chamber into the hopper.

2. In a device of the class described the combination of a hopper, a cylinder, a plunger within the cylinder, means for effecting relative movement of the hopper and the cylinder whereby to move the plunger into and from registration with the hopper, means to actuate the plunger for creating a chamber in the cylinder for receiving a plastic from the hopper and for moving the plunger toward the hopper while the chamber is in communication with the hopper, and means for reducing the pressure intermediate the plunger and the plastic within the chamber whereby to permit complete filling of the chamber with plastic.

3. In a device of the class described the combination of a hopper, a cylinder, a plunger reciprocally contained in the cylinder, and means for effecting relative movement of the hopper and the cylinder whereby to bring the plunger into and from registration with the hopper, for moving the plunger away from the hopper when in registration therewith whereby a plastic contained in the hopper is caused to enter the space vacated by the plunger, for effecting relative movement of the hopper and the cylinder whereby to reduce the passage between the hopper and the space created in the cylinder by the movement of the plunger, for moving the plunger toward the plastic in the last referred to space whereby to return some of the plastic to the hopper and for effecting further relative movement of the hopper and cylinder whereby to sever communication between the space in the cylinder and the hopper.

4. In a device of the class described the combination of a hopper, a cylinder, a plunger reciprocally contained in the cylinder, means for effecting relative movement of the hopper and the cylinder whereby to bring the plunger into and from registration with the hopper, for moving the plunger away from the hopper when in registration therewith whereby a plastic contained in the hopper is caused to enter the space vacated by the plunger, for effecting relative movement of the hopper and the cylinder whereby to reduce the passage between the hopper and the space created in the cylinder by the movement of the plunger, for moving the plunger toward the plastic in the last referred to space whereby to return some of the plastic to the hopper and for effecting further relative movement of the hopper and cylinder whereby to sever communication between the space in the cylinder and the hopper, and means for reducing the pressure within the space in the cylinder intermediate the plunger and the plastic whereby the plastic will completely fill the space in the cylinder before the plunger will return any of the plastic to the hopper.

5. In a device of the class described the combination of a hopper, a cylinder, a plunger reciprocally contained in the cylinder, and means for effecting relative movement of the hopper and the cylinder whereby to bring the plunger into and from registration with the hopper, for moving the plunger away from the hopper when in registration therewith whereby a plastic contained in the hopper is caused to enter the space vacated by the plunger, for effecting relative movement of the hopper and the cylinder whereby to reduce the passage between the hopper and the space created in the cylinder by the movement of the plunger, for moving the plunger toward the plastic in the last referred to space whereby to return some of the plastic to the hopper, for effecting further relative movement of the hopper and cylinder whereby to sever communication between the space in the cylinder and the hopper, and for actuating the plunger whereby to discharge the plastic from the cylinder.

6. In a device of the class described the combination of a hopper, a cylinder, a plunger reciprocally contained in the cylinder, means for effecting relative movement of the hopper and the cylinder whereby to bring the plunger into and from registration with the hopper, for moving the plunger away from the hopper when in registration therewith whereby a plastic contained in the hopper is caused to enter the space vacated by the plunger, for effecting relative movement of the hopper and the cylinder whereby to reduce the passage between the hopper and the space created in the cylinder by the movement of the plunger, for moving the plunger toward the plastic in the last referred to space whereby to return some of the plastic to the hopper, for effecting further relative movement of the hopper and cylinder whereby to sever communication between the space in the cylinder and the hopper, and for actuating the plunger whereby to discharge the plastic from the cylinder, and means for reducing the pressure within the space in the cylinder intermediate the plunger and the plastic whereby the plastic will completely fill the space in the cylinder before the plunger will return any of the plastic to the hopper.

7. In a device of the class described the combination of a cylinder, a hopper movable relative to the cylinder, a plunger reciprocally carried by the cylinder and adapted to be placed in and out of registration with the hopper through the relative movement of the hopper and cylinder, means for actuating the plunger whereby to draw into the cylinder a quantity of plastic from the hopper, means for effecting relative step by step movement between the hopper and the cylinder whereby the hopper and the cylinder are temporarily quiescent intermediate their limits of relative movement and the plunger will register in part only with the hopper, and means for creating a vacuum intermediate the plunger and a plastic that has entered into the cylinder, the plunger actuating means being adapted to move the plunger toward the plastic during partial registration of the plunger with the hopper whereby the plastic is caused to completely fill the space between the plunger and the hopper and whereby some of the plastic is returned from the cylinder to the hopper.

8. In a device of the class described the combination of a housing having a chamber formed therein, a cylinder carried by the housing, a plunger reciprocally contained within the cylinder adapted to assume a position with its one face flush with a face of the cylinder, a hopper supported by the housing and movable over the referred to faces of the cylinder and the plunger whereby the face of the plunger may register with the interior of the hopper and may assume a position exteriorly to the hopper, means within the chamber for actuating the hopper and for imparting a step by step movement to the hopper whereby the plunger may assume a position in partial registration with the hopper, and means within the chamber for moving the plunger away from the hopper when the hopper extends about the plunger face whereby to draw a plastic into the cylinder, for moving the plunger toward the hopper when the plunger registers in part only with the hopper whereby to expel a portion of the plastic from the cylinder, and for moving the plunger to bring its referred to face flush with the referred to face of the cylinder when the plunger is disposed completley without the hopper.

9. In a device of the class described the combination of a housing having a chamber formed therein, a cylinder carried by the housing, a plunger reciprocally contained within the cylinder adapted to assume a position with its one face flush with a face of the cylinder, a hopper supported by the housing and movable over the referred to faces of the cylinder and the plunger whereby the face of the plunger may register with the interior of the hopper and may assume a position exteriorly to the hopper, means within the chamber for actuating the hopper and for imparting a step by step movement to the hopper whereby the plunger may assume a position in partial registration with the hopper, means within the chamber for moving the plunger away from the hopper when the hopper extends about the plunger face whereby to draw a plastic into the cylinder, for moving the plunger toward the hopper when the plunger registers in part only with the hopper whereby to expel a portion of the plastic from the cylinder, and for moving the plunger to bring its referred to face flush relative to the referred to face of the cylinder when the plunger is disposed completely without the hopper, and means for creating a vacuum intermediate the plunger and the plastic contained in the cylinder when the plunger is in partial communication with the hopper.

10. The process of dividing plastics comprising drawing a plastic into a chamber through an opening communicating with said chamber whereby to fill the chamber with plastic, withdrawing gas from the chamber after the plastic has been drawn into the chamber, partly closing the opening through which plastic was admitted to the chamber and partly severing the plastic within the chamber from the plastic without the chamber whereby to provide a relatively small path of communication between the plastics within and without the chamber, applying pressure to the plastic within the chamber whereby to expel some of the plastic within the chamber by way of the reduced opening, and completely severing the plastic within and without the chamber.

11. In a device of the class described the combination of a hopper and a cylinder arranged for relative movement and for communication whereby a plastic within the hopper may move into the cylinder, a plunger within the cylinder, means for moving the plunger in the cylinder for sucking plastic into the cylinder, means for relatively moving the cylinder and hopper for partially severing the plastic within the hopper from the plastic within the cylinder and for reducing the path of communication between the cylinder and the hopper, means for actuating the plunger for exerting pressure upon the plastic within the cylinder and for ejecting some of the plastic from the cylinder, means for effecting relative movement of the hopper and cylinder for completely severing the plastic within the cylinder from the plastic within the hopper, and means for actuating the plunger for ejecting the plastic from the cylinder.

12. In a device of the class described the combination of a hopper and a cylinder arranged for relative movement and for communication whereby a plastic within the hopper may move into the cylinder, a plunger within the cylinder, means for moving the plunger in the cylinder for sucking plastic into the cylinder, means for relatively moving the cylinder and hopper for partially severing the plastic within the hopper from the plastic within the cylinder and for reducing the path of communication between the cylinder and the hopper, means for withdrawing gases from that portion of the cylinder containing the plastic, means for actuating the plunger for exerting pressure upon the plastic within the cylinder and for ejecting some of the plastic from the cylinder, means for effecting relative movement of the hopper and cylinder for completely severing the plastic within the cylinder from the plastic within the hopper, and means for actuating the plunger for ejecting the plastic from the cylinder.

13. The process of dividing plastics comprising the withdrawing from a given plastic mass of a quantity of plastic into a measuring chamber, then withdrawing gases from said chamber whereby to eliminate resistance to the movement of plastic in the chamber for complete filling of said measuring chamber with plastic, reducing the capacity of the measuring chamber to a determinable capacity for causing the plastic to completely fill said chamber and for causing any plastic in excess of the determinable chamber capacity to pass from the chamber, severing the withdrawn mass from the given mass and discharging the measuring chamber.

14. The process of dividing plastics comprising the placing of a measuring chamber in communication with a plastic mass under pressure, withdrawing gas from the measuring chamber for the creation in said chamber of a condition of reduced pressure immediately adjacent the mass of plastic whereby some of the plastic will enter the chamber, withdrawing any remaining gas from the chamber after plastic has entered said chamber, reducing the capacity of the chamber whereby to completely fill the chamber with plastic and to eject some of the plastic from the chamber, and severing the plastic within the chamber from the plastic without the chamber.

15. In a device of the class described the combination of a hopper adapted to receive a plastic, a cylinder for receiving plastic from the hopper, a plunger reciprocally mounted in the cylinder, means for effecting relative movement of the hopper and the cylinder whereby to bring the cylinder out of communication with the hopper, means for reciprocating the plunger, and means for creating a vacuum in the cylinder intermediate the plunger and the hopper.

16. The process of dividing plastics comprising the placing of a measuring chamber in communication with a plastic mass under pressure, withdrawing gas from the measuring chamber for the creation in said chamber of a condition of reduced air pressure immediately adjacent the mass of plastic under pressure whereby some of the plastic will enter the chamber, withdrawing any remaining gases from the chamber, reducing the path of communication between the chamber and the mass of plastic without the chamber, reducing the capacity of the chamber whereby to completely fill the chamber with plastic and to eject some plastic, and severing the plastic within the chamber from the plastic without the chamber.

17. The process of dividing plastics comprising the introduction of a plastic into a chamber through an opening communicating with said chamber whereby to fill the chamber with plastic, withdrawing gas from the chamber and plastic therein contained, partly closing the opening through which plastic was admitted to the chamber and partly severing the plastic within the chamber from the plastic without the chamber whereby to provide a relatively small path of communication between the plastics within and without the chamber, applying pressure to the plastic within the chamber whereby to expel some of the plastic from the chamber by way of the reduced opening, and completely severing the plastic within and without the chamber.

18. In combination a hopper means for receiving gas-containing dough, a cylinder having a bore providing communication with the hopper for receiving dough therefrom, a plunger in the cylinder for drawing dough from the hopper into the cylinder, the cylinder and the bore therein being so related to the opening in the hopper as to provide for a seal therebetween consisting wholly of the dough, means for extracting gases from the bore in the cylinder after dough has been drawn therein whereby to without mechanical pressure uniformly fill the bore in the cylinder with dough of uniform density, means to sever the body of dough within the bore from the body of dough in the hopper and means to effect limited extrusion of dough from the bore intermediate the beginning and end of the severing action.

19. In a device of the class described the combination of a hopper and a measuring receptacle arranged for relative movement and for communication whereby a plastic within the hopper may move into the receptacle, a plunger within the receptacle, means for moving the plunger in the receptacle and for introducing plastic into the receptacle, means for relatively moving the receptacle and hopper for partially severing the plastic within the hopper from the plastic within the receptacle and for reducing the path of communication between the receptacle and the hopper, means for actuating the plunger for exerting pressure upon the plastic within the receptacle and for ejecting some of the plastic from the receptacle, means for effecting relative movement of the hopper and receptacle for completely severing the plastic within the receptacle from the plastic within the hopper, and means for actuating the plunger for ejecting the plastic from the receptacle.

20. In a device of the class described the combination of a hopper and a measuring receptacle arranged for relative movement and for communication whereby a plastic within the hopper may move into the receptacle, a plunger within the receptacle, means for moving the plunger in the receptacle and for introducing plastic into the receptacle, means for relatively moving the receptacle and hopper for partially severing the plastic within the hopper from the plastic within the receptacle and for reducing the path of communication between the receptacle and the hopper, means for withdrawing gases from that portion of the receptacle containing the plastic, means for actuating the plunger for exerting pressure upon the plastic within the receptacle and for ejecting some of the plastic from the receptacle, means for effecting relative movement of the hopper and receptacle for completely severing the plastic within the receptacle from the plastic within the hopper, and means for actuating the plunger for ejecting the plastic from the receptacle.

21. The combination of a hopper, a measuring receptacle, means for supporting the hopper and measuring receptacle in proximity to each other and for movement relative one another whereby the measuring receptacle may be placed in communication with and placed out of communication with the hopper, means for introducing substance to be measured into the measuring receptacle from the hopper, means for reducing presure within the measuring receptacle after the substance has entered said receptacle, and means for effecting relative movement of the receptacle and hopper, for partly exhausting the measuring chamber into the hopper, for severing the substance within said receptacle from the substance in the hopper, and for completely exhausting the measuring chamber elsewhere than into the hopper.

22. The combination of a hopper and a measuring receptacle having movement relative one another and adapted for communication with one another, means for effecting relative movement of the hopper and receptacle for alternately bringing the measuring receptacle and hopper into and out of communication with one another, for introducing substance into the receptacle from the hopper when they are in communication, for partially exhausting the receptacle into the hopper, for severing the substance remaining in the receptacle from the substance in the hopper and for exhausting the receptacle after the hopper and receptacle are out of communication with one another.

23. The combination of a hopper and a measuring receptacle having movement relative one another and adapted for communication with one another, means for effecting relative movement of the hopper and receptacle for alternately bringing the measuring receptacle and hopper into and out of communication with one another, for introducing substance into the receptacle from the hopper when they are in communication, for reducing the communication between the hopper and receptacle and partly severing the substance in the receptacle from the substance in the hopper, for partially exhausting the receptacle into the hopper, for severing the substance remaining in the receptacle from the substance in the hopper and for exhausting the receptacle after the hopper and receptacle are out of communication with one another.

24. The combination of a hopper and a measuring receptacle having movement relative one another and adapted for communication with one another, means for effecting relative movement of the hopper and receptacle for alternately bringing the measuring receptacle and hopper into and out of communication with one another, for introducing substance into the receptacle from the hopper when they are in communication, for partially exhausting the receptacle into the hopper, for severing the substance remaining in the receptacle from the substance in the hopper and completely enclose the severed mass, and for exhausting the receptacle after the hopper and receptacle are out of communication with one another.

25. The combination with a hopper and a measuring receptacle adapted for communication with one another whereby divisible substance may pass between them, of means for introducing divisible substance into the receptacle from the hopper, for partially exhausting the receptacle into the hopper, for severing the substance remaining in the receptacle from the substance in the hopper, for bringing the hopper and receptacle out of communication and completely enclosing the substance within the measuring receptacle until after the substance is wholly detached from the substance in the hopper and for then discharging the measuring receptacle.

In testimony whereof, I have hereunto subscribed my name this 8th day of March, 1923.

SIGMUND SCHIFF.